United States Patent [19]

Romey et al.

[11] 4,204,986

[45] May 27, 1980

[54] SEALING, CAULKING AND PROTECTIVE SHIELDING COMPOSITION OF THERMOPLASTIC SYNTHETIC MATERIALS AND CARBONACEOUS MATERIALS

[75] Inventors: Ingo Romey, Hünxe; Aloys Schlütter; Rolf Sommerfeld, both of Kempen, all of Fed. Rep. of Germany

[73] Assignees: Bergwerksverband GmbH; Ruhrkohle AG, both of Essen, Fed. Rep. of Germany

[21] Appl. No.: 2,391

[22] Filed: Jan. 10, 1979

[30] Foreign Application Priority Data

Jan. 12, 1978 [DE] Fed. Rep. of Germany ....... 2801154

[51] Int. Cl.² ............................................. C08L 91/00
[52] U.S. Cl. .................... 260/28.5 AS; 260/28.5 AV; 260/28.5 A; 260/33.6 A; 260/33.6 PQ; 260/33.6 UA; 260/17.4 R; 260/17.4 BB; 264/153; 264/160; 264/328
[58] Field of Search ................. 260/33.6 A, 33.6 PQ, 260/33.6 UA, 28.5 A, 28.5 AV, 28.5 AS, 17.4 R, 17.4 BB; 264/153, 160, 328

[56] References Cited

U.S. PATENT DOCUMENTS

| | | | |
|---|---|---|---|
| 3,527,736 | 9/1970 | Averink et al. | 260/33.6 A |
| 3,687,889 | 8/1972 | Witte et al. | 260/33.6 A |

FOREIGN PATENT DOCUMENTS 1948526 7/1973 Fed. Rep. of Germany.

*Primary Examiner*—Melvyn I. Marquis
*Attorney, Agent, or Firm*—Michael J. Striker

[57] ABSTRACT

A sealing, packing, caulking and protective shielding composition comprising a mixture of at least one synthetic thermoplastic compound to which may be added at least one elastomer having thermoplastic properties with a carbonaceous material obtained by the liquefaction of coal which material has a boiling point above 350° C. at atmospheric pressure. The composition is useful, particularly for sealing and protective purposes in the building and installation industries, for instance in the form of foils for water-proofing various articles, as sealing compounds for pipes and as protective coating for containers, pipes, electric cables and so on.

11 Claims, No Drawings

SEALING, CAULKING AND PROTECTIVE SHIELDING COMPOSITION OF THERMOPLASTIC SYNTHETIC MATERIALS AND CARBONACEOUS MATERIALS

BACKGROUND OF THE INVENTION

The invention relates to a composition comprising a mixture of synthetic thermoplastic compounds, particularly polyolefins and their copolymers which may also contain an elastomer having thermoplastic properties and further must contain a carbonaceous material and, if desired, conventional fillers. Compositions involving mixtures of the described kind are mainly used for sealing and protective purposes in the building and installation industry, for instance in the form of foils for making products watertight as sealing compounds for pipes and sealing profiles as well as protective coverings of containers, pipes, electric cables and many other articles. Apart from pure mixtures of synthetic materials on one hand and mixtures on the other hand on the base of tar a large number of other composition mixtures has been proposed which principally contain ethylene copolymerisates as the synthetic components and certain bitumens as carbonaceous materials and furthermore, if desired, conventional fillers. Advances in the art of the synthetic materials have made it possible to use more and more types of starting materials. However, the range of bituminous carbonaceous material has undergone a gradual narrowing since only bitumens of specific origin having specific properties could be used to obtain the desired properties in the final product.

In the U.S. Pat. No. 3,249,567 mixtures have been described of about 5 to 95% by weight aromatic asphalts obtained from petroleum and about 5 to 95% by weight of ethylene copolymerisates with a proportion of 10 to 40% by weight of alkyl ester relative to the weight of the copolymerisate. In testing specimens of these mixtures tensile strengths were obtained up to about 4.5 N/mm$^2$ and elongations up to about 900%. The German accepted application 24 41 203 discloses shaped materials which essentially consist of ethylene copolymerisates and bitumen, the bitumen in this case being an extract- and/or precipitation bitumen which according to the German industrial norm DIN 1995 must exhibit a penetration at 25° C. smaller than 10. Tests with these materials showed tensile strengths up to about 8 N/mm$^2$ and elongations up to about 1100%.

From the German Pat. No. 1,948,526 ethylene copolymers containing bituminous sealing tapes have become known which consist of about 45 to 50% by weight of a mixture of polyethylene acrylic acid ester copolymerisate and a small fraction of bitumen, about 10 to 15% by weight of high pressure polyethylene and about 40% by weight of anthracite powder with a grain size up to 30μ and a proportion of non-combustible components of up to 30% by weight (relative to the anthracite powder fraction). Depending on the forming method (cast or extruded shapes) tensile strengths were obtained between 2 and 5 N/mm$^2$ and elongations between 300 and 1000%.

Shaped bodies from the described mixtures, however, have the shortcoming of a heavily reduced tensile strength and elongation at a temperature of 50° C. which has a most undesirable effect, for instance in case of the use of foils for roofing purposes. On the other hand, the range of raw materials is rather narrow in view of the bitumen and a scarcity of crude oil would have strong effects on the availability and price of the bitumen. The use, moreover, of crude oils of growing contents of sulfur and contaminations results in fluctuations of the quality of the bitumens which has an undesirable effect on the properties of the final composition.

It is, therefore, the problem of the present invention to broaden the range of raw materials for these mixtures of materials while maintaining the heretofore existing properties and, in addition, to improve the heat resistance of the materials.

SUMMARY OF THE INVENTION

The principal feature of the invention is the use as carbonaceous material of a product obtained by the liquefaction of coal which product has a boiling point above 350° C. at normal pressure.

Further features of the invention are these:

(a) The amount of inert, that is, not liquefiable components of the product together with any fillers which may be used is kept to a maximum amount of altogether 40% by weight of the total composition;

(b) The proportion of elastomers with thermoplastic properties is kept to a maximum of 25% by weight of the total mixture of materials;

(c) The vinyl acetate contents of the ethylene vinyl acetate copolymerisates used as the synthetic thermoplastic compounds is maintained within the range of 1 to 70% by weight relative to the copolymerisate; and (d) The coal liquefaction product which boils above 350° C. may also be purged of all solid non-liquefiable components.

The liquefaction of the coal for the product used in the above invention may be carried out according to any of several processes.

Frequently, coal is liquefied at high pressures of about 100 to 700 bar and at temperatures of about 400° to 500° C., usually in the presence of catalysts. The finely ground coal which usually has a grain size below 200μ is mixed with a pasting oil. Depending on the desired composition of the liquefaction product there is added a larger or smaller amount of hydrogen, either in gaseous form or in the form of a pasting oil which releases hydrogen. The more hydrogen there is used the lower will be the boiling point of the liquefaction product. However, in all cases the range of the product obtained will comprise a series of different hydrocarbons with increasing boiling temperatures starting usually with methane and then going through low or high boiling point oils to insoluble coal components and minerals (ash).

Well known coal liquefaction processes are for instance the Berqius-Pier, the Pott-Broche, the IG quick hydrogenation and the solvent-refined coal (SRC) process.

Another process whereby coal is liquefied is the famous Fischer-Trosch synthesis in which from the starting coal in a first stage there is first generated a synthesis gas from CO and H$_2$ which subsequently in a second stage is then converted to the liquid products. During the coal gasification (coal-pressure gasification=KDV) there are likewise obtained liquid products, so-called low temperature tars which are formed in the gasifier reactor at temperatures of about 500° to 700° C. and are separated from the gas.

In another variant of a process for coal liquefaction, coal or lignite are first subjected to a low temperature treatment at temperatures of 500° to 700° C. (Lurgie- Ruhrgas=LR process) whereby low temperature products are formed which can subsequently be further hydrogenated without difficulty to form oil.

Surprisingly, the present inventors have found that the product obtained by liquefying coal according for instance to any of the described processes which have a boiling point above 350° C. at normal pressure are excellently suited as the carbonaceous material for the above-described compositions and will improve their mechanical properties also at increased temperatures.

This is all the more surprising since other carbonaceous materials with a C:H ratio which is higher than that of most bitumens and which corresponds to the products used in the invention from the coal liquefaction have resulted when used in the described compositions rather in a deterioration than in an improvement of their properties, particularly in an increased brittleness.

Particularly unexpected was the fact that even the solid ballast materials, which in the framework of the present application refers to the non-liquefiable coal components such as inertinite and also the mineral components of the crude coal and any catalysts which may have been used, can be left in the composition and have a generally favorable effect on the tensile strength of the compositions. In this manner it is possible to find a new use for a residue which heretofore usually was subjected to burning or discarded in a waste depot.

The individual components of the compositions of the invention are subject to unlimited mixture. However, their should always be present a minimum amount of 3% by weight of the thermoplastic synthetic materials and, if such are added, of the elastomers having thermoplastic properties in the product of the invention and the reverse should also be true in order to at least have any noticeable effect on the properties of the final product.

For most uses a proportion of thermoplastic synthetic materials and, if present, elastomers having thermoplastic properties, is preferred in an amount of 30 to 90% by weight of the total composition, since shaped bodies of materials having a lower proportion of synthetics will exhibit a decrease in tensile strength and elongation. On the other hand mixtures with a higher proportion of synthetics, apart from the poor heat welding properties, show hardly any improvement over materials consisting only of synthetic mixtures.

By using exclusively thermoplastic synthetic compounds and, if desired, elastomers having thermoplastic properties, it is possible to obtain a relatively high tensile strength at simultaneous excellent elongation and heat sealing properties with hot air and other favorable properties. In addition, the pieces occurring as waste materials, remainders and already used materials can again be reprocessed to form new shaped bodies.

As synthetic thermoplastic compounds there are in the first place polyolefins and their copolymers suited such as polyethylene, polypropylene, ethylene, vinylacetatecopolymer, and others. It has been found that when using ethylenevinylacetate copolymerisates the contents of vinylacetate should be between 1 and 70% relative to the total polymerisate. At higher vinylacetate contents it is not possible to form useful shapes from these mixtures since their strength is then too low.

As elastomers with thermoplastic properties there may be used among others ethylene-propylene elastomers (EPM) and ethylene-propylene-terpolymer elastomer (if a diene is used in the terpolymer) (abbreviated herein as EPDM). It has been found that the proportion of elastomers with thermoplastic properties should advantageously be up to 25% by weight relative to the weight of the total composition. Higher proportions result in a predominance of the elastomer properties and unfavorably affect the heat sealing properties.

Depending on the amount of solid ballast materials, that is non-liquefiable component materials and possibly catalysts, in the coal liquefaction product conventional fillers may be added such as graphite, soot, anthracite powder, chalk, stone powder, wood meal and similar. However, it has been found that the total composition preferably should not have more than a total of 40% by weight of the solid ballast materials plus conventional fillers.

Surprisingly, it has also been found that most of the components from the liquefaction of the coal which have boiling points below 350° C. are preferably removed from the product prior to incorporation into the final composition. If the lower boiling point components remain in the product, the final formed bodies made of these mixtures frequently become sticky due to oil exudation.

As has already been pointed out, the proportion of low boiling oils and hydrocarbons of a low boiling point will vary according to the particular coal liquefaction process. Thus, the product of the invention obtained from liquifying coal by an extraction process upon addition of only little hydrogen will virtually be identical with the total reaction product. On the other hand, in case of liquifying coal by means of catalytic hydrogenation and addition of larger amounts of hydrogen, the undesired residue constituted by the bottom product after the vacuum distillation which may still amount to about 10 to 30% by weight of the initially used coal can still be used in the process of the invention for the final composition. Thus, the problems caused by such residue which may increase even more in future years, such as the provision of waste deposits, low temperature treatments, combustion or perhaps gasification, all of which involve environmental problems are completely avoided.

In case of the Fischer-Trosch synthesis the abovementioned low temperature tars which are formed in the gasification stage (KDV) can be used as such for the final composition because of their favorable C:H ratio.

The same applies for the so-called low temperature tars (LR). However, in this case likewise it is necessary to separate the oils which have boiling points below 350° C. The solids remaining in the product usually have no deleterious effects.

In general it may be desirable to separate the solid non-liquifiable components from the coal liquefaction process for use in the compositions of the invention wherever the demands regarding the properties of the product are particularly high such as for instance a particularly high flexibility. Such separation can be effected in conventiontional form, for instance by pressure filtration.

The formation of shaped bodies from the compositions of the invention can be effected in conventional form, usually by thorough mixing and/or kneading of the components at temperatures up to 250° C. and subsequent further forming steps usually by means of extrusion or injection apparatus.

PREFERRED EMBODIMENTS OF THE INVENTION

Examples illustrating the invention will be found in the table at the end of this specification. In all of these examples the following thermoplastic materials were used:

Low pressure polyethylene (PE):density 0.955 g/cm$^3$; crystallite melting range 127° to 131° C.
Ethylene vinylacetate with about 24 to 28% contents of vinylacetate (EVA):melt index about 5.

As thermoplastic elastomers, if used, the following were employed as further indicated in the table:
Ethylene-propylene copolymer elastomer (EPM):density 0.86; Mooney viscosity about 85; polymer crude strength about 13 MPa.
Ethylene-propylene-terpolymer elastomer having a diene as terpolymer component (EPDM); sequence type; density about 0.86; Mooney viscosity about 85; polymer crude strength about 13.

The filler used in one example was industrial chalk (IK) consisting of 98.5 to 98.7 CaCO$_3$; density 2.5; mean particle diameter 1 to 3$\mu$ (Champagne-chalk).

Regarding the products obtained obtained from the liquefaction of coal and having boiling points above 350° C. the following comments are furnished in reference to the data referred to in the table by the various abbreviations found in the legends of the table:

EXAMPLE A

Following the Pott-Broche process a mixture of 2 kg of finely ground gas long-flame coal of a grain-size below 200$\mu$, 3 liter of a solvent (antracene oil) and 20 g of catalyst (cobalt-molybdenum) were placed in a 10 liter autoclave. Molecular hydrogen was then introduced into the autoclave at a pressure of 300 bar. The autoclave was then heated upon stirring to 420° C. After a reaction time of 2 hours the autoclave was subjected to cooling and the formed reaction mixture was taken out. By separating the low boiling fractions and the solvent in a distillation installation at 300° C. and 30 millibar the coal product used in the invention having a boiling point of 350° C. at atmospheric pressure was obtained. This product is referred to in the table as Pott-Broche product (abbreviated PBP).

EXAMPLE B

Another coal product useful in the invention was formed in that the product made in the process described in Example A after removal from the autoclave was subjected to filtration in a pressure filter at 240° C. and 4 to 8 bar to remove the undissolved carbon components as well as the minerals and the catalyst. After this distillative separation step for the low boiling components a product was obtained for use in the invention which in the following table will be designated as PBP (F).

EXAMPLE C

Another product useful for the invention was obtained generally following the Bergius-Pier process. For this purpose a long flame gas coal was ground to a size below 100$\mu$ and was mixed with a mash forming oil which was obtained from the hydrogenation operation itself. For each four parts of coal there were used six parts of mash forming oil. The mixture was then hydrogenated in a hydrogenation reactor together with a catalyst (Fe$_2$O$_3$) at a pressure of 300 bar and a temperature of 475° C. while adding about 5% of molecular hydrogen. In this manner there was formed in the hydrogenation reactor a mixture of gases, coal oils of different boiling points components and undistillable organic components as well as undissolved coal, minerals and catalyst.

This mixture was separated in a separator vessel into a bottom product consisting of heavy oil, asphalts, undissolved coal, minerals and catalyst and into a top product consisting of lower boiling oils and gases.

The top product was then separated in a vacuum distillation installation from the distillable oils at a pressure of about 35 millibar and 200° to 300° C. The thus obtained residue constituted the carbonaceous material having a boiling point above 350° C. for use in the present invention. This product when obtained by a vacuum distillation at 35 millibar and 200° C. is designated in the table below as the Bergius-Pier Product 1 ("BPP 1") while the product resulting from the vacuum distillation at 35 millibar and 300° C. is designated as BPP 2.

Part of these products were then subjected to a filtration at 250° C. and 2 to 8 bar resulting in a separation of the undissolved coal and mineral components and of the catalyst. These latter products are then designated herein as BPP 1 (F) and BPP 2 (F).

As low temperature tars there were used two products which were obtained from a pressure gasifier (KDVP) and from a low temperature installation (LRP). In case of the KDVP product this was a tar with a solid contents of 15% and a softening point of 95%. In case of the LRP product this was a tar with a solid contents of likewise 15% and a softening point of 85%. In case of both products the oils having boiling points below 350° C. were removed by distillation.

The compositions of the invention consisting of the thermoplastic compounds and, if used, of the elastomer and filler were then all formed in the same manner. The various components were mixed at 150° to 250° C. in a high power mixer or mechanical kneader and were pressed preferably at a temperature of about 180° C. to form parts from which the specimens for the determination of the properties as shown in the table were obtained by punching. The tests were carried out according to the German norm DIN 53,455.

Following the DIN formula the tensile strength was determined in N/mm$^3$ and the elongation in percent at 23 and at 50° C.

All values obtained and all components of the composition are shown in the table.

The table furthermore includes a comparison example which is based on the example of the German patent 1,948,526 which has been discussed above in the background chapter of this application. The results of the tests show the superiority of the specimens made of the composition of the present invention as compared with the prior art. In general it is noted that the shaped bodies made from the compositions of the invention can be heat sealed, have a high resistance to concentrated loads and UV radiation as well as to all kinds of weather action. Besides, they have a low ignition point.

These bodies are therefore useful in the form of foils as sealing compounds for roofings and for the linings of tools for fire-fighting purposes, for waste deposits and for tunnel construction. The compositions of the invention can also be formed by injection molding and can be used as protective coverings on containers, walls, etc.

TABLE

| Example No. | Synthetic thermoplastic | elastomer having thermoplastic properties | filler | coal liquefaction product | tensile strength elongation at 23° C. | tensile strength elongation at 50° C. |
|---|---|---|---|---|---|---|
| 1 | 50% PE | — | — | 50% PBP (F) | 5.7/46% | — |
| 2 | 60% EVA | 20% EPDM | — | 20% PBP | 26.0/663% | — |
| 3 | 20% EVA | 10% EPDM | — | 70% PBP (F) | 15.8/10% | — |
| 4 | 30% EVA | 20% EPM | — | 50% BPP 2 (F) | 4.9/625% | — |
| 5 | 50% EVA | — | — | 50% BPP 1 | 6.2/471% | 1.6/430% |
| 6 | 50% EVA | — | — | 50% BPP 2 | 4.8/244% | 2.5/340% |
| 7 | 33% EVA | 17% EPDM | — | 50% BPP 1 | 4.7/510% | 1.0/520% |
| 8 | 46% EVA | 4% EPDM | — | 50% BPP 1 | 6.6/542% | 1.8/670% |
| 9 | 25% EVA | 11% EPDM | 28% IK | 36% BPP 1 | 4.1/450% | 1.1/640% |
| 10 | 60% EVA | 20% EPDM | — | 20% BPP 1 | 11.1/550% | 2.9/670% |
| 11 | 38% EVA | 12% EPDM | — | 50% BPP 1 | 6.3/530% | 1.5/590% |
| 12 | 30% EVA | 10% EPDM | — | 60% BPP 1 | 4.0/470% | 1.0/500% |
| 13 | composition of the example German Patent 1,948,526 (see above) | | | | 4.0/350% | 0.9/170% |
| 14 | 25% EVA | 20% EPDM | — | 55% KDVP | 4.6/580% | 2.4/460% |
| 15 | 35% EVA | 15% EPDM | — | 50% LRP | 4.8/560% | 2.2/380% |

Legends
PE low pressure polyethylene
EVA ethylene vinyl acetate (about 24–28% contents of vinyl acetate)
EPM ethylene-propylene elastomer
EPDM ethylene-propylene (diene) terpolymer elastomer
PBP coal liquefaction by Pott-Broche process
PBP (F) same, after distillative separation of low boiling compounds
BPP 1 coal liquefaction by Bergius-Pier with vacuum distribution at 35 m bar and 200° C.
BPP 2 same with vacuum distillation at 35 m bar and 300° C.
BPP 2(F) same but including a filtration at 250° and 2–8 bar to remove undissolved coal and minerals and catalyst
KVDP coal liquefaction by Bergius-Pier using a low temperature tar from a pressure gasifier
LRP same but tar from a low temperature carbonizing plant
IK industrial chalk (98.5 to 98.7% CaCO$_3$)

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sealing, packing, caulking and protective shielding composition comprising a mixture of (a) at least one synthetic thermoplastic compound which may include at least one elastomer having thermoplastic properties and (b) between 3 and 97% by weight of a carbonaceous material obtained by the liquefaction of coal which material has a boiling point above 350° C. at atmospheric pressure.

2. The composition of claim 1 in which the amount of thermoplastic compound or mixture of thermoplastic compound and elastomer is between 30 to 90% by weight of the total composition.

3. The composition of claim 1 wherein the thermoplastic compound is an ethylene vinylacetate copolymerisate having a vinyl acetate contents of 1 to 70% by weight relative to the total copolymerisate.

4. The composition of claim 1 wherein the amount of said elastomer having thermoplastic properties is up to 25% by weight of the total composition.

5. The composition of claim 1 wherein the non-liquefiable components of the coal and a filler or fillers are present in an amount up to 40% by weight of the total composition.

6. The composition of claim 5 wherein the fillers are graphite, soot, anthracite powder, chalk, stone powder or wood meal.

7. The composition of claim 1 wherein the predominant amount of coal components having boiling points below 350° C. at atmospheric pressure have been removed from the liquified coal product prior to its incorporation into the composition.

8. The composition of claim 1 wherein the total liquefaction product is obtained by means of one of the following coal liquefaction processes: Bergius-Pier; Pott-Broche, IG quick hydrogenation; solvent-refined coal (SRC) or Lurgie-Ruhrgas.

9. The composition of claim 1 which comprises 20 to 60% by weight of at least one thermoplastic compound and 20 to 70% by weight of the liquified coal product.

10. The composition of claim 9 which includes 4 to 20% of an elastomer having thermoplastic properties with a corresponding reduction of the amount of thermoplastic compound.

11. A shaped body formed by a pressure shaping process from the composition of claim 1.

* * * * *